United States Patent
Saitou et al.

(10) Patent No.: US 10,811,165 B2
(45) Date of Patent: Oct. 20, 2020

(54) INSULATION MATERIAL

(71) Applicant: KURARAY CO., LTD., Kurashiki-shi (JP)

(72) Inventors: Yuusuke Saitou, Kamisu (JP); Takahiro Suzuki, Kamisu (JP); Junichi Fuji, Chiyoda-ku (JP)

(73) Assignee: KURARAY CO., LTD., Kurashiki-shi (JP)

( * ) Notice: Subject to any disclaimer, the term of this patent is extended or adjusted under 35 U.S.C. 154(b) by 289 days.

(21) Appl. No.: 15/532,007

(22) PCT Filed: Dec. 3, 2015

(86) PCT No.: PCT/JP2015/084033
§ 371 (c)(1),
(2) Date: May 31, 2017

(87) PCT Pub. No.: WO2016/088841
PCT Pub. Date: Jun. 9, 2016

(65) Prior Publication Data
US 2017/0271042 A1 Sep. 21, 2017

(30) Foreign Application Priority Data
Dec. 5, 2014 (JP) .................... 2014-246625

(51) Int. Cl.
| H01B 3/00 | (2006.01) |
|---|---|
| H01B 3/44 | (2006.01) |
| C08L 27/06 | (2006.01) |
| C08K 5/11 | (2006.01) |
| H01B 7/02 | (2006.01) |
| C08L 101/00 | (2006.01) |
| C08K 5/10 | (2006.01) |
| C08K 3/22 | (2006.01) |
| C08K 5/00 | (2006.01) |
| C08L 23/16 | (2006.01) |
| H01B 3/42 | (2006.01) |
| C08L 23/28 | (2006.01) |

(52) U.S. Cl.
CPC .............. H01B 3/443 (2013.01); C08K 3/22 (2013.01); C08K 5/0016 (2013.01); C08K 5/10 (2013.01); C08K 5/11 (2013.01); C08L 23/16 (2013.01); C08L 27/06 (2013.01); C08L 101/00 (2013.01); H01B 3/422 (2013.01); H01B 7/02 (2013.01); C08K 2003/2296 (2013.01); C08L 23/286 (2013.01); C08L 2201/02 (2013.01); C08L 2201/04 (2013.01); C08L 2201/08 (2013.01); C08L 2203/202 (2013.01); C08L 2666/04 (2013.01)

(58) Field of Classification Search
CPC ....................................................... H01B 3/00
See application file for complete search history.

(56) References Cited

U.S. PATENT DOCUMENTS

| 2,311,260 | A | * | 2/1943 | Staff | ............... | C07C 69/753 |
|---|---|---|---|---|---|---|
| | | | | | | 524/285 |
| 2,705,226 | A | * | 3/1955 | Bond | .............. | C08F 14/06 |
| | | | | | | 525/60 |
| 4,277,388 | A | * | 7/1981 | Kagami | ............ | C08F 8/12 |
| | | | | | | 360/134 |
| 2004/0138358 | A1 | | 7/2004 | Koch et al. | | |
| 2009/0036581 | A1 | * | 2/2009 | Joshi | .............. | C08K 5/10 |
| | | | | | | 524/291 |
| 2012/0136101 | A1 | * | 5/2012 | Hong | ............... | C07C 67/26 |
| | | | | | | 524/308 |

(Continued)

FOREIGN PATENT DOCUMENTS

| GB | 688513 | * | 3/1953 |
|---|---|---|---|
| JP | 58-220874 A | | 12/1983 |

(Continued)

OTHER PUBLICATIONS

Extended European Search Report dated Jul. 4, 2018 in European Patent Application No. 15864321.3, citing documents AO and AP therein, 7 pages.
Koichi Murai , "Kasozai, Sono Riron to Oyo" (Plasticizers, Their Theories and Applications), Saiwai Shobo, Total 3 Pages, 1973.
International Search Report dated Feb. 2, 2016 in PCT/JP2015/084033 Filed Dec. 3, 2015.
Office Action dated Jul. 16, 2019 in Japanese Patent Application No. 2016-562676.
Nakajima, N. et al., "Effect of Plasticizer Type on Gelation and Fusion of PVC Plastisol, Dialkyl Phthalate Series", Journal of Vinyl Technology, vol. 13, No. 4, Dec. 1991, pp. 212-222.

*Primary Examiner* — Chau N Nguyen
(74) *Attorney, Agent, or Firm* — Oblon, McClelland, Maier & Neustadt, L.L.P.

(57) ABSTRACT

[Problem] To provide an insulation material that has an excellent volume resistivity while retaining the balance among various capabilities including the mechanical strength, the heat resistance, the oil resistance, the bleed-out resistance, the plasticizer migration resistance, and the like, equivalent to a resin composition containing an ordinary phthalate ester.
[Solution] An insulation material containing a resin composition containing: an ester (i) having one or more constitutional unit represented by the following formula (A) (wherein $R^1$ and $R^2$ each independently represent an alkyl group having from 1 to 4 carbon atoms); and a resin (ii).

(A)

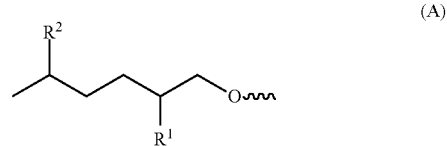

20 Claims, No Drawings

(56) References Cited

U.S. PATENT DOCUMENTS

2012/0259131 A1* 10/2012 de Munck .............. B01J 8/0015
549/248

FOREIGN PATENT DOCUMENTS

| | | |
|---|---:|---|
| JP | 6-166644 A | 6/1994 |
| JP | 7-102141 A | 4/1995 |
| JP | 9-87435 A | 3/1997 |
| JP | 9-132689 A | 5/1997 |
| JP | 2000-53803 A | 2/2000 |
| JP | 2001-2829 A | 1/2001 |
| JP | 2001-207002 A | 7/2001 |
| JP | 2004-143177 A | 5/2004 |
| JP | 2004-158465 A | 6/2004 |

* cited by examiner

INSULATION MATERIAL

TECHNICAL FIELD

The present invention relates to an insulation material. Specifically, the present invention relates to an insulation material containing a resin composition containing an ester, and an electric cable using the insulation material.

BACKGROUND ART

A vinyl chloride resin (polyvinyl chloride, PVC) is one of representative plastics, and has been applied to a wide variety of purposes due to the inexpensiveness and the excellent properties thereof. A vinyl chloride resin has a hard and brittle nature due to the strong interaction among the high polarity molecular chains thereof, and is used after adding a plasticizer thereto since it is difficult to process the resin as it is. A plasticizer weakens the interaction among the molecular chains by entering among the molecular chains, thereby softening the vinyl chloride resin. Various ester compounds are used as a plasticizer, and an aromatic polybasic carboxylate ester, such as a phthalic acid series, a trimellitic acid series, and a pyromellitic acid series; an aliphatic polybasic carboxylate ester, such as an adipic acid series, an azelaic acid series, and a sebacic acid series; a polyester series, an epoxy series, and a phosphoric acid series are generally used. These plasticizers exhibit various performance depending on the kinds thereof, and are frequently used solely or as a combination of plural kinds thereof corresponding to the purposes.

Among these plasticizers, a phthalic acid series, particularly dioctyl phthalate, is frequently used due to high plasticizing performance, the excellent heat resistance and cold resistance, and the inexpensiveness thereof. A vinyl chloride resin has hardness that is determined by the kind and the amount of the plasticizer added thereto, and is roughly classified into a hard one and a soft one.

A soft vinyl chloride resin is excellent in various properties including water resistance, acid resistance, alkali resistance, solvent resistance, chemical stability, flame retardancy, and electric insulation property, and is widely applied to various films and sheets, ropes, agricultural materials, construction materials, automobile components, insulation materials and covering materials for electric cables, and the like.

The range of applications of the soft vinyl chloride resin is being continuously enhanced, and there is a demand of further enhancement of the aforementioned properties. In the field of insulation materials and covering materials for electric cables, in particular, a higher volume resistivity is being demanded associated with thinning electric cables due to the reduction in size and weight of electric equipments and automobile components.

It has been known that the volume resistivity of the soft vinyl chloride resin varies depending on the kind and the molecular structure of the plasticizer used. According to NPL 1, the volume resistivity of the soft vinyl chloride resin becomes larger with a larger branching degree of the alcohol carbon chain constituting the plasticizer molecule. PTL 1 determines the parameter showing the topological characteristics of the branched structure for an aliphatic alcohol mixture having 10 carbon atoms and a phthalate cliester mixture produced from the alcohol mixture, and describes that a soft vinyl chloride resin that uses the phthalate cliester mixture within a particular range as a plasticizer is excellent in cold resistance, heat resistance, electric insulation property, and the like. PTL 2 describes that a soft vinyl chloride resin that uses an ester of an alcohol mixture having 10 carbon atoms having various branched structures (2-propyl-1-heptanol, 4-methyl-2-propyl-1-hexanol, 5-methyl-2-propyl-1-hexanol, and 2-isopropyl-1-heptanol) and a carboxylic acid, such as phthalic acid, adipic acid, azelaic acid, sebacic acid, trimellitic acid, and pyromellitic acid, as a plasticizer is excellent in electric insulation property.

As a plasticizer that imparts an excellent volume resistivity, a trimellitate ester and a pyromellitate ester have been known, and PTL 3 describes a vinyl chloride resin composition for covering an electric cable excellent in electric insulation property that uses an aromatic polybasic carboxylate plasticizer, such as a trimellitate ester and a pyromellitate ester.

CITATION LIST

Non-Patent Literature

NPL 1: "Kasozai, Sono Riron to Oyo" (Plasticizers, Their Theories and Applications), edited and written by Koichi MURAI, Saiwai Shobo, 1973

Patent Literatures

PTL 1: JP-A 2001-2829
PTL 2: JP-A 6-166644
PTL 3: JP-A 2004-158465

SUMMARY OF INVENTION

Technical Problem

However, the volume resistivity of the soft vinyl chloride resin that uses the plasticizers described in the aforementioned literatures still has room for improvement in the achievement of the higher insulation property that is demanded associated with the reduction in thickness of insulation materials and covering materials for electric cables using the soft vinyl chloride resin. Furthermore, for the alcohol moiety in the plasticizer molecule, it is still unknown as to what specific type of the branched structure contributes to the enhancement of the volume resistivity of the soft vinyl chloride resin.

Accordingly, an object of the present invention is to provide an insulation material that has an excellent volume resistivity while retaining the balance among various performances including the mechanical strength, heat resistance, oil resistance, bleed-out resistance, plasticizer migration resistance, and the like, which are equivalent to those of a resin composition containing an conventional phthalate ester.

Solution to Problem

As a result of extensive and intensive researches, the present inventors have found that by providing a particular branched structure to a unit constituting an ester moiety in a molecule used as a plasticizer, a resin composition containing the plasticizer has an excellent volume resistivity. The present invention has been accomplished on the basis of the above finding.

Accordingly, the present invention provides the following items [1] to [10].

[1] An insulation material containing a resin composition containing:

an ester (i) having one or more constitutional unit represented by the following formula (A):

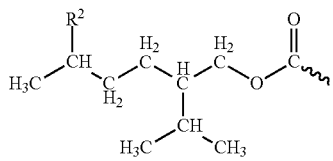
(A)

wherein $R^1$ and $R^2$ each independently represent an alkyl group having from 1 to 4 carbon atoms; and
a resin (ii).

[2] The insulation material according to the item [1], wherein the ester (i) is an ester that is obtained through condensation of an alcohol represented by the following formula (1);

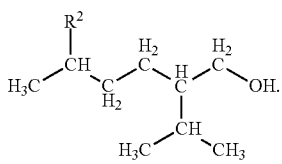
(1)

wherein $R^1$ and $R^2$ each independently represent an alkyl group having from 1 to 4 carbon atoms, and an acid component.

[3] The insulation material according to the item [2], wherein the acid component is one selected from the group consisting of an aromatic polybasic carboxylic acid, an aromatic polybasic carboxylic anhydride, an aliphatic polybasic carboxylic acid, and an aliphatic polybasic carboxylic anhydride.

[4] The insulation material according to any one of the items [1] to [3], wherein $R^1$ and $R^2$ each independently represent a methyl group, an ethyl group, a propyl group, or an isopropyl group.

[5] The insulation material according to any one of the items [1] to [4], wherein a content of the ester (i) is 20% by mass or more based on a plasticizer contained in the insulation material.

[6] The insulation material according to any one of the items [1] to [5], wherein the resin (ii) is a vinyl chloride resin.

[7] A method for insulation, containing using the insulation material according to any one of the items [1] to [6].

[8] Use of the insulation material according to any one of the items [1] to [6] for insulation.

[9] The insulation material according to any one of the items [1] to [6], which is for covering an electric cable.

[10] An electric cable containing the insulation material according to the item [9].

Advantageous Effects of Invention

According to the present invention, it is possible to provide an insulation material having an excellent volume resistivity and an electric cable using the insulation material.

DESCRIPTION OF EMBODIMENTS

The insulation material of the present invention contains a resin composition containing an ester (which is hereinafter referred to as an ester (i)) having one or more constitutional unit represented by the following formula (A) (which is hereinafter referred to as a constitutional unit (A)) and a resin (ii). The components will be described below.

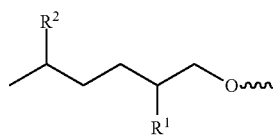
(A)

In the formula, $R^1$ and $R^2$ each independently represent an alkyl group having from 1 to 4 carbon atoms.

Examples of the ester (i) include an aromatic monocarboxylate ester, such as a benzoate ester, a 2-methylbenzoate ester, a 3-methylbenzoate ester, a 4-methylbenzoate ester, a 1-naphthoate ester, a 2-naphthoate ester, a 2-furancarboxylate ester, and a 3-furancarboxylate ester; an aromatic polybasic carboxylate ester, such as a phthalate ester, an isophthalate ester, a terephthalate ester, a trimellitate ester, and a pyromellitate ester; an aliphatic monocarboxylate ester, such as a caprylate ester, a caprate ester, a laurate ester, a myristate ester, a palmitate ester, a stearate ester, an oleate ester; an aliphatic polybasic carboxylate ester, such as an oxalate ester, a malonate ester, a succinate ester, a glutarate ester, an adipate ester, a pimelate ester, a suberate ester, an azelate ester, a sebacate ester, a fumarate ester, and a maleate ester; an alicyclic monocarboxylate ester, such as a cyclobutanecarboxylate ester, a cyclopentanecarboxylate ester, a cyclohexanecarboxylate ester, a cycloheptanecarboxylate ester, and a cyclooctanecarboxylate ester; an alicyclic polybasic carboxylate ester, such as a 1,2-cyclohexanedicarboxylate ester, a 1,3-cyclohexanedicarboxylate ester, and a 1,4-cyclohexanedicarboxylate ester; and a phosphate ester.

Among these esters, a phthalate ester, an isophthalate ester, a terephthalate ester, a trimellitate ester, a pyromellitate ester, an adipate ester, a pimelate ester, a suberate ester, an azelate ester, a sebacate ester, a 1,2-cyclohexanedicarboxylate ester, a 1,3-cyclohexanedicarboxylate ester, and a 1,4-cyclohexanedicarboxylate ester are preferred, and a phthalate ester, a trimellitate ester, an adipate ester, an azelate ester, a sebacate ester, and a 1,2-cyclohexanedicarboxylate ester are particularly preferred.

The production method of the ester (i) is not particularly limited, and the ester (i) can be produced by a known method. In the case of a carboxylate ester, for example, the ester can be produced in such a manner that a desired carboxylic acid or an anhydride thereof is subjected to esterification reaction with an alcohol (1) described later, and the reaction is performed while removing generated water through condensation reaction outside the system. In the case of a phosphate ester, for example, the ester can be produced by subjecting an alcohol (1) described later to reaction with phosphoryl chloride in the presence of a catalyst, such as aluminum chloride, neutralizing, washing with water, and purifying the resultant by removing impurities such as by-produced hydrochloride.

The ester (i) is preferably produced by condensing an alcohol represented by the following formula (1) (which is hereinafter referred to as an alcohol (1)) and an acid component. In the case where a polybasic carboxylic acid is used as the acid component, not only the ester (i) that is condensed only with the alcohol (1) as an alcohol, but also the ester (i) that is condensed with another alcohol along with the alcohol (1) can be produced. Among these esters, the ester (i) is preferably obtained by condensing only the alcohol (1) as an alcohol.

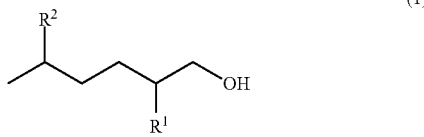

(1)

In the formula, $R^1$ and $R^2$ have the meanings defined above.

In the constitutional unit (A) and the alcohol (1), the alkyl group having from 1 to 4 carbon atoms represented independently by each of $R^1$ and $R^2$ is preferably a methyl group, an ethyl group, a propyl group, or an isopropyl group, it is more preferred that $R^1$ is an ethyl group, a propyl group, or an isopropyl group, and $R^2$ is a methyl group or an ethyl group, and it is further preferred that $R^1$ is an isopropyl group, and $R^2$ is a methyl group.

Specifically, as the alcohol (1), preferred are 2,5-dimethyl-1-hexanol, 2-ethyl-5-methyl-1-hexanol, 5-methyl-2-propyl-1-hexanol, 2-isopropyl-5-methyl-1-hexanol, 2,5-dimethyl-1-heptanol, 2-ethyl-5-methyl-1-heptanol, 2,5-dimethyl-1-octanol, and 2,5,6-trimethyl-1-heptanol, and particularly preferred are 2,5-dimethyl-1-hexanol, 2-ethyl-5-methyl-1-hexanol, 5-methyl-2-propyl-1-hexanol, and 2-isopropyl-5-methyl-1-hexanol.

The production method of the alcohol (1) is not particularly limited, and examples thereof include known methods such as a method, in which an olefin having approximately from 6 to 12 carbon atoms, which is obtained through multimerization of a lower olefin having approximately from 2 to 6 carbon atoms, such as ethylene, is formed into an aldehyde through hydroformylation reaction, and then hydrogenated, and a method, in which an aldehyde having 5 carbon atoms, which is obtained through hydroformylation reaction of a butene compound, is dimerized through aldol condensation, and then hydrogenated.

As for the ester (i), the production method of the carboxylate ester will be described in detail below.

The production of the carboxylate ester can be performed in the presence or absence of a solvent. The solvent is not particularly limited as far as the solvent does not inhibit the reaction, and examples thereof include an aromatic solvent, such as benzene, toluene, ethylbenzene, o-xylene, m-xylene, p-xylene, 1,2,3-trimethylbenzene, 1,2,4-trimethylbenzene, and mesitylene; and an ether solvent, such as tetrahydrofuran, 2-methyltetrahydrofuran, 3-methyltetrahydrofuran, tetrahydropyran, 2-methyltetrahydropyran, 3-methyltetrahydropyran, 4-methyltetrahydropyran, 1,4-dioxane, cyclopentyl methyl ether, 1,2-dimethoxyethane, diethylene glycol dimethyl ether, triethylene glycol dimethyl ether, tetraethylene glycol dimethyl ether, propylene glycol dimethyl ether, dipropylene glycol dimethyl ether, and tripropylene glycol dimethyl ether. These solvents may be used solely or as a combination of two or more kinds thereof. Among these, toluene is preferably used since water formed can be efficiently removed through azeotropy.

In the case where the reaction is performed in the presence of a solvent, the amount of the solvent used is preferably from 0.5 to 3 parts by mass, more preferably from 1 to 2.5 parts by mass, and further preferably from 1.5 to 2 parts by mass, on the basis of 1 part by mass of the carboxylic acid, from the standpoint of the volume efficiency and the water removal efficiency through azeotropy.

The esterification reaction may be performed in the presence of a catalyst. Examples of the catalyst include various compounds that function as a Bronsted acid or a Lewis acid, such as sulfuric acid, methanesulfonic acid, p-toluenesulfonic acid, tetraisopropyl titanate, dibutyl tin oxide, and aluminum chloride. The catalysts may be used solely or as a combination of two or more kinds thereof. Among these, methanesulfonic acid and p-toluenesulfonic acid are preferably used from the standpoint of the compatibility with the solvent.

In the case where the reaction is performed in the presence of a catalyst, the amount of the catalyst used is preferably from 0.01 to 0.05 part by mass, and more preferably from 0.02 to 0.03 part by mass, on the basis of 1 part by mass of the carboxylic acid, from the standpoint of the reaction rate and the cost.

The reaction temperature for the esterification reaction is not particularly limited, and is generally set to a temperature that is the boiling point of the ester to be produced or less, from the standpoint of the thermal stability of the ester to be formed, and the like. The reaction temperature is preferably approximately from 60 to 250° C., and more preferably from 100 to 200° C., while the reaction temperature may vary depending on the kinds of the carboxylic acid or an anhydride thereof, the alcohol, and the solvent, and the like to be used.

The reaction pressure for the esterification reaction is not particularly limited, and the reaction may be performed under ordinary pressure or under increased pressure. The reaction is preferably performed under the atmospheric pressure from the standpoint of the simplification of the reaction device and equipment.

The reaction time for the esterification reaction may vary depending on the kinds of the carboxylic acid or an anhydride thereof, the alcohol, and the solvent, and the like to be used, and is generally preferably from 1 to 10 hours, and more preferably from 3 to 7 hours.

After completing the esterification reaction, the general post-processing steps including neutralization of the acid catalyst, washing with water, dehydration under reduced pressure, filtration, sublimation purification, vacuum distillation, steam distillation, and the like, are performed, so as to remove the unreacted carboxylic acid or an hydride thereof, the unreacted alcohol, the catalyst, and the like, remaining therein, thereby providing the target ester. At this time, additives that are generally used, such as a decolorant, a deodorant, and an absorbent, may be added depending on necessity.

The ester (i) may be used as, in addition to the purpose of a plasticizer constituting the insulation material of the present invention, a solvent, such as a solvent for producing an agricultural chemical and a solvent for a coating material; a resin modifier, such as a compatibility improver, a diluent, a processability improver, and a lubricant; a sealing material; a rubber modifier; a functional material and an intermediate thereof, such as a medical drug, a perfume, a surfactant, an agricultural chemical, a liquid crystal, and an electronic material; a raw material intermediate, such as an end capping agent for a polymer; a lubricant, such as a lubricating oil for an engine and a driving device of an automobile, a ship, an aircraft, and the like, a lubricating oil for a reduction gearbox mechanism, a compressor, and a vacuum pump, an industrial lubricating oil, e.g., a refrigerator oil, a metalworking oil, and a fiber processing oil, and a grease; a constitutional component of a polymerization catalyst for an olefin (for example, an electron donor); and a gasoline additive.

The ester (i) may be used as a mixture with an additional plasticizer as needed in such a range that does not impair the effect of the present invention. The content of the ester (i) is not particularly limited, and the content of the ester (i) is preferably 20% by mass or more, more preferably 30% by mass or more, and further preferably 50% by mass or more, based on the plasticizer contained in the insulation material. A high volume resistivity may be exhibited when the content of the ester (i) is 20% by mass or more based on the plasticizer contained in the insulation material.

Examples of the additional plasticizer include dimethyl phthalate, diethyl phthalate, dipropyl phthalate, diallyl phthalate, diisopropyl phthalate, dibutyl phthalate, di-sec-butyl phthalate, diisobutyl phthalate, di-tert-butyl phthalate, dipentyl phthalate, diisopentyl phthalate, dihexyl phthalate, diisohexyl phthalate, diheptyl phthalate, diisoheptyl phthalate, bisdibutylbenzyl phthalate, di(2-ethylhexyl) phthalate, di-n-octyl phthalate, diisooctyl phthalate, dinonyl phthalate, diisononyl phthalate, di(3,5,5-trimethylhexyl) phthalate, di-n-decyl phthalate, diisodecyl phthalate, diundecyl phthalate, didodecyl phthalate, ditridecyl phthalate, ditetradecyl phthalate, di(2-ethylhexyl) isophthalate, isophthalate, diisooctyl isophthalate, dinonyl isophthalate, diisononyl isophthalate, di-n-decyl isophthalate, diisodecyl isophthalate, diundecyl isophthalate, didodecyl isophthalate, ditridecyl isophthalate, ditetradecyl isophthalate, di(2-ethylhexyl) terephthalate, di-n-octyl terephthalate, diisooctyl terephthalate, dinonyl terephthalate, diisononyl terephthalate, di-n-decyl terephthalate, diisodecyl terephthalate, diundecyl terephthalate, didodecyl terephthalate, ditridecyl terephthalate, ditetradecyl terephthalate, tri(2-ethylhexyl) trimellitate, tri-n-octyl trimellitate, triisooctyl trimellitate, trinonyl trimellitate, triisononyl trimellitate, tri-n-decyl trimellitate, triisodecyl trimellitate, triundecyl trimellitate, tridodecyl trimellitate, tri(tridecyl) trimellitate, tritetradecyl trimellitate, tetra(2-ethylhexyl) pyromellitate, tetra-n-octyl pyromellitate, tetraisooctyl pyromellitate, tetranonyl pyromellitate, tetraisononyl pyromellitate, tetra-n-decyl pyromellitate, tetraisodecyl pyromellitate, tetraundecyl pyromellitate, tetradodecyl pyromellitate, tetratridecyl pyromellitate, tetra(tetradecyl) pyromellitate, isobutyl oleate, diethyl succinate, dibutyl adipate, diisobutyl adipate, bis[2-(2-butoxyethoxy)ethyl] adipate, di(2-ethylhexyl) adipate, di-n-octyl adipate, diisooctyl adipate, dinonyl adipate, diisononyl adipate, adipate, diisodecyl adipate, diundecyl adipate, didodecyl adipate, ditridecyl adipate, ditetradecyl adipate, di(2-ethylhexyl) pimelate, di-n-octyl pimelate, diisooctyl pimelate, dinonyl pimelate, diisononyl pimelate, di-n-decyl pimelate, diisodecyl pimelate, diundecyl pimelate, didodecyl pimelate, ditridecyl pimelate, ditetradecyl pimelate, di(2-ethylhexyl) suberate, di-n-octyl suberate, diisooctyl suberate, dinonyl suberate, diisononyl suberate, di-n-decyl suberate, diisodecyl suberate, diundecyl suberate, didodecyl suberate, ditridecyl suberate, ditetradecyl suberate, di(2-ethylhexyl) azelate, azelate, diisooctyl azelate, dinonyl azelate, diisononyl azelate, di-n-decyl azelate, diisodecyl azelate, diundecyl azelate, didodecyl azelate, ditridecyl azelate, ditetradecyl azelate, dibutyl sebacate, di(2-ethylhexyl) sebacate, sebacate, diisooctyl sebacate, dinonyl sebacate, diisononyl sebacate, di-n-decyl sebacate, diisodecyl sebacate, diundecyl sebacate, didodecyl sebacate, ditridecyl sebacate, ditetradecyl sebacate, dibutyl fumarate, dibutyl maleate, di(2-ethylhexyl) 1,2-cyclohexanedicarboxylate, di-n-octyl 1,2-cyclohexanedicarboxylate, diisooctyl 1,2-cyclohexanedicarboxylate, dinonyl 1,2-cyclohexanedicarboxylate, diisononyl 1,2-cyclohexanedicarboxylate, di-n-decyl 1,2-cyclohexanedicarboxylate, diisodecyl 1,2-cyclohexanedicarboxylate, diundecyl 1,2-cyclohexanedicarboxylate, didodecyl 1,2-cyclohexanedicarboxylate, ditridecyl 1,2-cyclohexanedicarboxylate, ditetradecyl 1,2-cyclohexanedicarboxylate, di(2-ethylhexyl) 1,3-cyclohexanedicarboxylate, di-n-octyl 1,3-cyclohexanedicarboxylate, diisooctyl 1,3-cyclohexanedicarboxylate, dinonyl 1,3-cyclohexanedicarboxylate, diisononyl 1,3-cyclohexanedicarboxylate, di-n-decyl 1,3-cyclohexanedicarboxylate, diisodecyl 1,3-cyclohexanedicarboxylate, diundecyl 1,3-cyclohexanedicarboxylate, didodecyl 1,3-cyclohexanedicarboxylate, ditridecyl 1,3-cyclohexanedicarboxylate, ditetradecyl 1,3-cyclohexanedicarboxylate, di(2-ethylhexyl) 1,4-cyclohexanedicarboxylate, 1,4-cyclohexanedicarboxylate, diisooctyl 1,4-cyclohexanedicarboxylate, dinonyl 1,4-cyclohexanedicarboxylate, diisononyl 1,4-cyclohexanedicarboxylate, 1,4-cyclohexanedicarboxylate, diisodecyl 1,4-cyclohexanedicarboxylate, diundecyl 1,4-cyclohexanedicarboxylate, didodecyl 1,4-cyclohexanedicarboxylate, ditridecyl 1,4-cyclohexanedicarboxylate, ditetradecyl 1,4-cyclohexanedicarboxylate, an adipic acid/glycol polyester-based plasticizer, a pimelic acid/glycol polyester-based plasticizer, a suberic acid/glycol polyester-based plasticizer, an azelaic acid/glycol polyester-based plasticizer, a sebacic acid/glycol polyester-based plasticizer, an epoxidized soybean oil, an epoxidized linseed oil, an epoxidized fatty acid octyl ester, an epoxidized fatty acid alkyl ester, a dipentaerythritol ester, tributyl acetylcitrate, ethylphthalyl ethylglycolate, trimethyl phosphate, triethyl phosphate, tributyl phosphate, tris(2-ethylhexyl) phosphate, triphenyl phosphate, trixylenyl phosphate, cresyl diphenyl phosphate, (2-ethylhexyl) diphenyl phosphate, tricresyl phosphate, methyl acetyl ricinoleate, glyceryl triacetate, and N-butylbenzenesulfonamide.

The resin composition containing the ester (i) and the resin (ii) is excellent in various properties including flexibility and the like, and can be favorably applied to various purposes.

Examples of the resin (ii) include a vinyl chloride-based resin, chlorinated polyethylene, chlorinated polyvinyl chloride, polyvinylidene chloride, isoprene rubber, butadiene rubber, nitrile rubber, styrene-butadiene rubber, chloroprene rubber, ethylene-propylene rubber, polytetrafluoroethylene, polyvinylidene fluoride, polyvinyl fluoride, polyethylene, polypropylene, polyvinyl alcohol, polylactic acid, a styrol resin, a cellulose resin, an acrylic resin, an acrylonitrile resin, a urethane resin, a vinyl acetate resin, a butyral resin, an ethylene-vinyl acetate copolymer resin, an ethylene-vinyl acetate-carbon monoxide copolymer resin, a styrene-acrylonitrile copolymer resin, an acrylonitrile-butadiene-styrene resin, and an acrylate-styrene-acrylonitrile copolymer resin. These may be used solely or as a combination of two or more kinds thereof.

Among these, a vinyl chloride-based resin is preferred.

The "vinyl chloride-based resin" herein means a resin containing vinyl chloride as a major constitutional unit, such as a copolymer containing vinyl chloride as a major component with other comonomers as well as an unmodified vinyl chloride resin containing only vinyl chloride as a monomer. The resin may be produced by a known method, such as a suspension polymerization method. Examples of the comonomer capable of being copolymerized with vinyl chloride include an α-olefin, such as ethylene, propylene, and 1-butene; a conjugated diene, such as butadiene and isoprene; vinyl alcohol, styrene, acrylonitrile, vinyl acetate, vinyl propionate, fumaric acid or an ester thereof, maleic acid or an ester or anhydride thereof, an acrylic acid or an ester thereof, methacrylic acid or an ester thereof, and isoprenol.

The compounding amount of the ester (i) to the resin (ii) may vary depending on the desired extents of the flexibility and the processability, in terms of the total amount of the ester (i) and the additional plasticizer, which may be mixed therewith depending on necessity, is generally from 1 to 200 parts by mass, preferably from 10 to 150 parts by mass, and more preferably from 30 to 70 parts by mass, on the basis of 100 parts by mass of the resin (ii). When the amount thereof added is less than 1 part by mass, there may be a tendency that the flexibility and the processability of the resulting resin composition are insufficient, and when the amount thereof added exceeds 200 parts by mass, there may be a tendency that bleed-out of the ester (i) from the resin composition or gelation failure in processing are caused.

The resin composition may contain, in addition to the resin (ii) and the ester (i), an additive in such a range that does not impair the object of the present invention. Examples of the additive include a filler, such as silica-based powder, clay, talc, aluminum hydroxide, and calcium carbonate; a lubricant, such as liquid paraffin, wax, a higher fatty acid or a salt thereof, a fatty acid ester, a fatty acid amide, a higher alcohol, and a metallic soap; a flame retardant, such as barium borate, zinc borate, antimony trioxide, zinc oxide, chlorinated polyethylene, a phosphoric acid-based flame retardant, and a halogen-based flame retardant; an antioxidant, such as a phenolic antioxidant, a sulfur-based antioxidant, and a phosphorus-based antioxidant; a colorant, such as an inorganic pigment and an organic pigment; an ultraviolet ray absorbent, such as a benzotriazole compound, a benzophenone compound, and a hindered amine compound; a foaming agent, such as oxybisbenzylhydrazide and azodicarbonamide; a lead-based stabilizer, such as tribasic lead sulfate, a lead orthosilicate-silica gel coprecipitate, dibasic lead stearate, and dibasic lead phthalate; a stabilizer, such as a barium/zinc-based stabilizer, a barium/cadmium-based stabilizer, a calcium/zinc-based stabilizer, an aluminum-based stabilizer, a silicon-based stabilizer, a tin-based stabilizer, and a magnesium-based stabilizer; a surfactant; and an antistatic agent.

In the case where the additives are mixed with the resin composition depending on necessity, the amount thereof mixed is generally from 0.1 to 10 parts by mass, and preferably from 1 to 5 parts by mass, on the basis of 100 parts by mass of the resin (ii).

The resin composition can be prepared by mixing the ester (i), the resin (ii), the additional plasticizer, the additives, and the like under heating with the known method and equipment depending on the purpose, such as a blender, a planetary mixer, and a Banbury mixer, thereby providing the insulation material of the present invention.

Thereafter, the insulation material may be processed and molded into a desired product form by a known molding method, for example, such a molding method as extrusion molding, calender molding, injection molding, heat molding, coating process, and dipping process.

The purpose of the insulation material of the present invention is not particularly limited, and may be applied to any purpose that requires electric insulation property. Examples the purpose include an insulating tape, an insulating cloth, an insulating film, an insulating sheet, shoes, a shoe sole, clothing, gloves, a helmet, a capacitor, a battery material (such as a vessel and a separator), an insulating adhesive, an interior and exterior packages and a covering of an electric equipment, a resin product around an electric cable, a cabling connector, and a plug socket, a coating of an electric work tool, a screw, a bolt, a nut, a washer, an electronic circuit board, a printed board, grease for an electronic equipment, an insulating varnish, and an insulating paint.

The resin composition constituting the insulation material of the present invention may also be applied to a purpose that does not necessarily require electric insulation property. Examples the purpose include clothing, a rainwear, an umbrella, a bag, a rope, an insect screen (such as a net window), a packaging material, intravenous injection bag and tube, a bottle for cosmetics, shampoo, or detergent, a blood reservoir (such as a blood platelet reservoir), a tissue embedding material, a water pipe, a pipe joint, a hose pipe, a tank, an automobile underbody coating, a refrigerator gasket, a packing material, various kinds of artificial leather (such as ordinary artificial leather, sponge artificial leather having a foamed layer, and sandwich sponge artificial leather), various foamed materials, a construction material (such as wallpaper, a floor material, a cushion material, a heat insulation material, a soundproof material, a protective agent, a terrace, a skylight window, a carport, a blindfold board, a storeroom, an arcaded, and a watershoot), a signboard, a stationery product, an eraser, a card, a sticker, a toy, an adhesive, an adhesive plaster, an agricultural film, a fishing net, a brush, a hairpiece, and a phonograph record.

For covering a conductor (for example, a metal, such as copper) with the insulation material of the present invention, a known extrusion covering machine having an extruder can be used. For example, an electric cable can be produced at a rate of from around 300 to 450 m per minute under a condition of an extruder temperature of from 160 to 200° C. and a crosshead temperature of 180° C.

The form of the electric cable, to which the insulation material of the present invention is applied as a cable covering, is not particularly limited, and the insulation material can be applied as an insulation material for known various electric cables, such as a solid wire, a flat wire, and a shielded wire.

The utilization method of the electric cable of the present invention is not particularly limited, and the electric cable can be applied to automobile use, electric equipment use, communication use, electric power use, ship use, aircraft use, and the like.

EXAMPLES

The present invention will be specifically described with reference to examples and the like below, but the present invention is not limited to the examples.

Production Example 1

(1) Ester Synthesis

To a glass three-neck flask having a capacity of 500 mL equipped with a magnetic stirrer, a thermometer, a nitrogen introducing pipe, a Dean-Stark trap, and a reflux condenser, 123 g (0.777 mol) of 2-isopropyl-5-methyl-1-hexanol (produced by Tokyo Chemical Industry Co., Ltd.), 57.5 g (0.388 mol) of phthalic anhydride (produced by Wako Pure Chemical Industries, Ltd.), 100 g of toluene (produced by Wako Pure Chemical Industries, Ltd.), and 1.52 g (15.8 mmol) of methanesulfonic acid (produced by Wako Pure Chemical Industries, Ltd.) as an acid catalyst were charged under a nitrogen atmosphere. The solution was reacted for 5 hours by heating to an inner temperature of 120° C. under stirring. Thereafter, the reaction system was depressurized to remove the solvent and unreacted 2-isopropyl-5-methyl-1-hexanol, and then neutralization, washing with water, and dehydration under reduced pressure were performed to provide 144 g (0.322 mol) of bis(2-isopropyl-5-methyl-1-hexyl) phthalate.

$^1$H-NMR (400 MHz, CDCl$_3$, tetramethylsilane (TMS), ppm): δ 0.87 (d, CH$_3$, 6H), 0.88 (d, CH$_3$, 6H), 0.92 (d, CH$_3$, 12H), 1.14-1.61, 1.80-1.88 (m, 14H), 4.26 (dd, —O—CH$_2$—, 4H), 7.52 (dd, ArH, 2H), 7.69 (dd, ArH, 2H)

(2) Production of Resin Composition and Soft Vinyl Chloride Resin Sheet

With 100 parts by mass of a polyvinyl chloride resin having an average polymerization degree of 1,000 (TK-1000, a trade name, produced by Shin-Etsu Chemical Co., Ltd.), 50 parts by mass of bis(2-isopropyl-5-methyl-1-hexyl) phthalate synthesized in the item (1) above and 5 parts by mass of tribasic lead sulfate as a stabilizer were mixed. The mixture was kneaded with a planetary mixer (produced by Toyo Seiki Co., Ltd.) at 120° C. and a rotation number of 60 rpm. The completion of the dry-up (i.e., the increase in flowability of the mixture due to absorption of the plasticizer to the polyvinyl chloride resin) was determined by the decline of torque of the mixer. The mixture was rolled on a two-mill roll at 150° C. for 10 minutes (roll width: 220 mm, roll gap: 1 mm) and then pressed to a thickness of 1 mm with a 26-ton hydraulic molding machine (produced by Toho Press Seisakusho Co., Ltd.) (preliminary press: 0.5 MPa at 170° C. for 4 minutes, press: 5 MPa at 170° C. for 1 minute, cooling: 0.5 MPa at 20° C. for 10 minutes), thereby producing a soft vinyl chloride resin sheet.

Production Example 2

(1) Ester Synthesis

The reaction and the post process were performed in the same manner as in Production Example 1 except that 49.8 g (0.259 mol) of trimellitic anhydride (produced by Wako Pure Chemical Industries, Ltd.) was used instead of phthalic anhydride to provide 131 g (0.208 mol) of tris(2-isopropyl-5-methyl-1-hexyl) trimellitate.

$^1$H-NMR analysis (400 MHz, CDCl$_3$, TMS, ppm) δ 0.87-0.97 (m, CH$_3$, 36H), 1.15-1.65, 1.79-1.90 (m, 21H), 4.25-4.36 (m, —O—CH$_2$-, 6H), 7.72 (d, ArH, 1H), 8.17 (dd, ArH, 1H), 8.37 (d, ArH, 1H)

(2) Production of Resin Composition and Soft Vinyl Chloride Resin Sheet

A soft vinyl chloride resin sheet was produced in the same manner as in the item (2) of Production Example 1 except that 25 parts by mass of tris(2-isopropyl-5-methyl-1-hexyl) trimellitate synthesized in the item (1) above and 25 parts by mass of dioctyl phthalate (Vinycizer 80, a trade name, produced by Kao Corporation) were used instead of 50 parts by mass of bis(2-isopropyl-5-methyl-1-hexyl) phthalate.

Production Example 3

(1) Ester Synthesis

The reaction and the post process were performed in the same manner as in Production Example 1 except that 56.8 g (0.389 mol) of adipic acid (produced by Wako Pure Chemical Industries, Ltd.) was used instead of phthalic anhydride to provide 129 g (0.302 mol) of bis(2-isopropyl-5-methyl-1-hexyl) adipate.

$^1$H-NMR (400 MHz, CDCl$_3$, TMS, ppm) δ 0.86-0.90 (m, CH$_{13}$, 24 H), 1.10-1.55, 1.62-1.82 (m, 18H), 2.29-2.34 (m, —CH$_2$—COO, 4H), 3.98-4.07 (m, —O—CH$_2$-, 4H)

(2) Production of Resin Composition and Soft Vinyl Chloride Resin Sheet

A soft vinyl chloride resin sheet was produced in the same manner as in the item (2) of Production Example 1 except that 50 parts by mass of bis(2-isopropyl-5-methyl-1-hexyl) adipate synthesized in the item (1) above was used instead of 50 parts by mass of bis(2-isopropyl-5-methyl-1-hexyl) phthalate.

Production Example 4

(1) Ester Synthesis

The reaction and the post process were performed in the same manner as in Production Example 1 except that 78.5 g (0.388 mol) of sebacic acid (produced by Wako Pure Chemical Industries, Ltd.) was used instead of phthalic anhydride to provide 161 g (0.333 mol) of bis(2-isopropyl-5-methyl-1-hexyl) sebacate.

$^1$H-NMR analysis (400 MHz, CDCl$_3$, TMS, ppm) δ 0.86~0.90 (m, CH$_3$, 24H), 1.10-1.83 (m, 26H), 2.28 (t, —CH$_2$—COO, 4H), 3.97-4.06 (m, —O—CH$_2$—, 4H)

(2) Production of Resin Composition and Soft Vinyl Chloride Resin Sheet

A soft vinyl chloride resin sheet was produced in the same manner as in the item (2) of Production Example 1 except that 50 parts by mass of bis(2-isopropyl-5-methyl-1-hexyl) sebacate synthesized in the item (1) above was used instead of 50 parts by mass of bis(2-isopropyl-5-methyl-1-hexyl) phthalate.

Comparative Production Example 1

A soft vinyl chloride resin sheet was produced in the same manner as in the item (2) of Production Example 1 except that 50 parts by mass of dioctyl phthalate (Vinycizer 80, a trade name, produced by Kao Corporation) was used instead of 50 parts by mass of bis(2-isopropyl-5-methyl-1-hexyl) phthalate.

Comparative Production Example 2

A soft vinyl chloride resin sheet was produced in the same manner as in the item (2) of Production Example 1 except that 50 parts by mass of diisononyl phthalate (Vinycizer 90, a trade name, produced by Kao Corporation) was used instead of 50 parts by mass of bis(2-isopropyl-5-methyl-1-hexyl) phthalate.

Comparative Production Example 3

A soft vinyl chloride resin sheet was produced in the same manner as in the item (2) of Production Example 1 except that 50 parts by mass of diisodecyl phthalate (produced by J-Plus Co., Ltd.) was used instead of 50 parts by mass of bis(2-isopropyl-5-methyl-1-hexyl) phthalate.

Comparative Production Example 4

A soft vinyl chloride resin sheet was produced in the same manner as in the item (2) of Production Example 1 except that 50 parts by mass of bis(2-propyl-1-heptyl) phthalate was used instead of 50 parts by mass of bis(2-isopropyl-5-methyl-1-hexyl) phthalate.

Comparative Production Example 5

A soft vinyl chloride resin sheet was produced in the same manner as in the item (2) of Production Example 1 except that 50 parts by mass of bis(2-ethyl-1-octyl) phthalate was used instead of 50 parts by mass of bis(2-isopropyl-5-methyl-1-hexyl) phthalate.

Comparative Production Example 6

A soft vinyl chloride resin sheet was produced in the same manner as in the item (2) of Production Example 1 except that 50 parts by mass of bis(3,7-dimethyl-1-octyl) phthalate was used instead of 50 parts by mass of bis(2-isopropyl-5-methyl-1-hexyl) phthalate.

Comparative Production Example 7

A soft vinyl chloride resin sheet was produced in the same manner as in the item (2) of Production Example 1 except that 50 parts by mass of bis(2-methyl-1-nonyl) phthalate was used instead of 50 parts by mass of bis(2-isopropyl-5-methyl-1-hexyl) phthalate.

Comparative Production Example 8

A soft vinyl chloride resin sheet was produced in the same manner as in the item (2) of Production Example 1 except that 50 parts by mass of trioctyl trimellitate (Trimex T-08NB, a trade name, produced by Kao Corporation) was used instead of 50 parts by mass of bis(2-isopropyl-5-methyl-1-hexyl) phthalate.

Comparative Production Example 9

A soft vinyl chloride resin sheet was produced in the same manner as in the item (2) of Production Example 1 except that 50 parts by mass of diisodecyl adipate (Vinycizer 50, a trade name, produced by Kao Corporation) was used instead of 50 parts by mass of bis(2-isopropyl-5-methyl-1-hexyl) phthalate.

Examples 1 to 4

The soft vinyl chloride resin sheets obtained in Production Examples 1 to 4 each were measured and evaluated for properties in the following manners. The results are shown in Table 1.

(1) Tensile test: The test was performed according to JIS K6723.

(2) Volume resistivity test: The test was performed according to JIS K6723 at 30° C.

(3) Tensile test after heating: The test was performed according to JIS K6723 after heating at 100° C. or 120° C. for 120 hours.

(4) Oil resistance test: The test was performed according to JIS K6723 after immersing in a test oil at 70° C. for 4 hours.

(5) Bleed-out test: Test pieces (n=3) molded in a size of 100 mm×100 mm×1 mm were heated in an oven at 70° C. for 20 days, and the presence of bleed-out of the plasticizer (exuding from the PVC sheet) was visually evaluated (n=3).

(6) Migration test: One test piece molded in a size of 20 mm×50 mm×1 mm was overlapped one ABS resin plate having the same dimension as the test piece, which were heated in an oven at 80° C. for 72 hours, and the presence of migration of the plasticizer from the PVC sheet to the ABS resin plate was visually evaluated (n=6). The same test was also performed by using a polyethylene resin plate instead of the ABS resin plate.

Comparative Examples 1 to 9

The soft vinyl chloride resin sheets obtained in Comparative Production Examples 1 to 9 were measured and evaluated for properties in the same manners as in Examples 1 to 4. The results are shown in Table 1.

TABLE 1

| | | Example | | | | Comparative Example | | | | | | | | |
|---|---|---|---|---|---|---|---|---|---|---|---|---|---|---|
| | | 1 | 2 | 3 | 4 | 1 | 2 | 3 | 4 | 5 | 6 | 7 | 8 | 9 |
| Tensile test | Tensile strength (MPa) | 23.4 | 23.0 | 18.5 | 15.4 | 21.3 | 22.1 | 26.0 | 26.5 | 27.0 | 27.0 | 27.4 | 23.3 | 18.6 |
| | Elongation (%) | 324 | 315 | 300 | 220 | 304 | 332 | 400 | 375 | 410 | 405 | 395 | 320 | 310 |
| | 100% Modulus (MPa) | 13.4 | 12.7 | 11.0 | 10.4 | 10.6 | 10.3 | 13.5 | 13.9 | 13.8 | 14.1 | 13.5 | 13.4 | 11.3 |
| Tensile test after heating (100° C.) | Retention of Tensile strength (%) | 93 | | | | 96 | 93 | | | | | | 98 | |
| | Retention of Elongation (%) | 99 | | | | 101 | 100 | | | | | | 109 | |
| | 100% Modulus (MPa) | 14.0 | | | | 11.5 | 11.0 | | | | | | 13.9 | |
| Tensile test after heating (120° C.) | Retention of Tensile strength (%) | 102 | | | | 109 | 98 | | 90 | 96 | 95 | 90 | 93 | |
| | Retention of Elongation (%) | 99 | | | | 88 | 94 | | 70 | 75 | 80 | 80 | 110 | |
| | 100% Modulus (MPa) | 16.2 | | | | 17.3 | 12.6 | | 18.4 | 18.3 | 18.5 | 17.0 | 13.1 | |
| Oil resistance test (70° C.) | Retention of Tensile strength (%) | 93 | | | | 93 | 92 | | | | | | 92 | |
| | Retention of Elongation (%) | 88 | | | | 91 | 84 | | | | | | 88 | |
| | 100% Modulus (MPa) | 14.4 | | | | 11.3 | 11.6 | | | | | | 14.0 | |
| Bleed-out test (70° C.) | | *1 | | | | | | *1 | | | | | *1 | |
| Migration test (80° C.) | ABS resin plate | *2 | | | | | | *2 | | | | | *2 | |
| | Polyethylene resin plate | *2 | | | | | | *2 | | | | | *2 | |
| Volume resistivity (×10^13 Ω·cm) | | 155.1 | 130.7 | 0.53 | 0.73 | 8.5 | 6.0 | 15.6 | 6.8 | 6.4 | 5.9 | 3.9 | 131.5 | 0.04 |

(*1: slightly discolored with no other particular change)

(*2: no particular change)

The following points were found from Examples and Comparative Examples for the insulation material of the present invention.

The comparison among the phthalate esters revealed that the soft vinyl chloride sheets of Comparative Examples 1 to 7 obtained by molding the resin compositions using the phthalate esters having no constitutional unit (A) each had a low volume resistivity, whereas the soft vinyl chloride sheet of Example 1 obtained by molding the resin composition using the ester (i) having the constitutional unit (A) exhibited a high volume resistivity.

The comparison between the trimellitate esters revealed that the soft vinyl chloride sheet of Example 2 obtained by molding the resin composition using the trimellitate ester having the constitutional unit (A) exhibited a high volume resistivity equivalent to the case of Comparative Example 8 using only trioctyl trimellitate, even though dioctyl phthalate having no constitutional unit (A) was used as a mixture. It has been known that as compared to a phthalate ester and the like, a trimellitate ester is a plasticizer capable of imparting various capabilities demanded for a soft vinyl chloride resin without impairing largely the volume resistivity inherent to the vinyl chloride resin. The use the trimellitate ester having the constitutional unit (A) provides the same effect only by replacing a part of used phthalate ester by the trimellitate ester, and thus can suppress the amount of expensive trimellitic acid used.

The comparison between the aliphatic ester, such as the adipate esters and the sebacate esters, provided the similar tendency, and the soft vinyl chloride sheets of Examples 3 and 4 obtained by molding the resin compositions using the esters (i) having the constitutional unit (A) each exhibited a high volume resistivity, as compared to the soft vinyl chloride sheets of Comparative Example 9 obtained by molding the resin composition using the ester having no constitutional unit (A).

Resin compositions are used for various purposes and are different in demanded capabilities depending on the purposes. The amounts of plasticizers added also vary depending on the purposes, and therefore the necessary values of the mechanical characteristics, the volume resistivity, the heat resistance, the oil resistance, and the plasticizer migration property of the resin composition cannot be determined unconditionally, but the values in the examples can be regarded as the certain reference values. It is understood from the results of the examples that assuming the same amount of the plasticizer added, an excellent volume resistivity can be exhibited while retaining the mechanical strength, the heat resistance, the oil resistance, and the plasticizer migration property of the resin composition, only in the case where the ester (i) having the particular structure having the constitutional unit (A) is used as the plasticizer.

Example 5

The resin compositions of Examples 1, 2, 3, and 4 each were extrusion-molded on a copper wire at a linear velocity of 400 m per minute by using a cable extruder having a screw diameter of 60 mm and L/D of 25 at a cylinder temperature of the extruder of 190° C. and a crosshead temperature thereof of 180° C., thereby producing covered electric cables.

INDUSTRIAL APPLICABILITY

The insulation material of the present invention has a high volume resistivity and can be advantageously applied to any purpose that requires electric insulation property.

The invention claimed is:

1. An insulation material comprising a resin composition comprising:
   an ester (i) comprising a constitutional unit having a branched structure and being represented by formula (A):

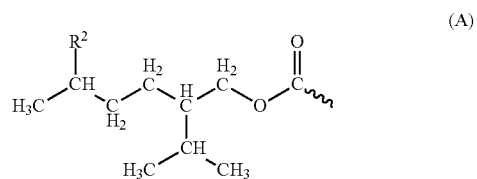

wherein $R^2$ is an alkyl group having from 1 to 4 carbon atoms; and
   a resin (ii).

2. The insulation material according to claim 1, wherein the ester (i) is obtained through condensation of an alcohol having a branched structure and being represented by formula (I):

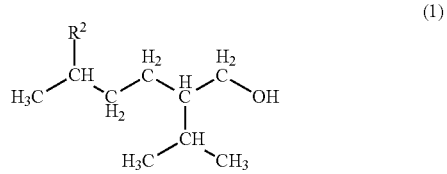

wherein $R^2$ is an alkyl group having from 1 to 4 carbon atoms, and an acid component.

3. The insulation material according to claim 2, wherein the acid component is one selected from the group consisting of an aromatic polybasic carboxylic acid, an aromatic polybasic carboxylic anhydride, an aliphatic polybasic carboxylic acid, and an aliphatic polybasic carboxylic anhydride.

4. The insulation material according to claim 1, wherein $R^2$ is a methyl group, an ethyl group, a propyl group, or an isopropyl group.

5. The insulation material according to claim 1, wherein a content of the ester (i) is 20% by mass or more based on a plasticizer comprised in the insulation material.

6. The insulation material according to claim 1, wherein the resin (ii) is a vinyl chloride resin.

7. A method of insulating an object, the method comprising contacting the object with the insulation material according to claim 1.

8. The method according to claim 7, wherein the object is an electric cable.

9. An electric cable comprising the insulation material according to claim 1.

10. The insulation material according to claim 1, wherein $R^2$ is a methyl group.

11. The insulation material according to claim 1, wherein the ester (i) is obtained through condensation of 2-isopropyl-5-methyl-1-hexanol, and an acid component.

12. The insulation material according to claim 11, wherein the acid component is one selected from the group consisting of an aromatic polybasic carboxylic acid, an aromatic polybasic carboxylic anhydride, an aliphatic polybasic carboxylic acid, and an aliphatic polybasic carboxylic anhydride.

13. The insulation material according to claim 11, wherein a total amount of the ester (i) and, optionally, an additional plasticizer is from 1 to 200 parts by mass, based on 100 parts by mass of the resin (ii).

14. The insulation material according to claim 11, wherein a total amount of the ester (i) and, optionally, an additional plasticizer is from 10 to 150 parts by mass, based on 100 parts by mass of the resin (ii).

15. The insulation material according to claim 11, wherein a total amount of the ester (i) and, optionally, an additional plasticizer is from 30 to 70 parts by mass, based on 100 parts by mass of the resin (ii).

16. The insulation material according to claim 1, wherein the ester (i) is obtained through condensation of 2-isopropyl-5-methyl-1-hexanol, and an acid component; and the resin (ii) is a vinyl chloride resin.

17. The insulation material according to claim 16, wherein the acid component is one selected from the group consisting of an aromatic polybasic carboxylic acid, an aromatic polybasic carboxylic anhydride, an aliphatic polybasic carboxylic acid, and an aliphatic polybasic carboxylic anhydride.

18. The insulation material according to claim 1, wherein a total amount of the ester (i) and, optionally, an additional plasticizer is from 1 to 200 parts by mass, based on 100 parts by mass of the resin (ii).

19. The insulation material according to claim 1, wherein a total amount of the ester (i) and, optionally, an additional plasticizer is from 10 to 150 parts by mass, based on 100 parts by mass of the resin (ii).

20. The insulation material according to claim 1, wherein a total amount of the ester (i) and, optionally, an additional plasticizer is from 30 to 70 parts by mass, based on 100 parts by mass of the resin (ii).

* * * * *